HAROLD L. ZIMMERMAN &
FREDERICK J. VAN ZEELAND
INVENTORS.

BY George A. Evans

Patented Nov. 7, 1950

2,528,810

UNITED STATES PATENT OFFICE 2,528,810

INDUCTION HEATING AND WELDING

Harold L. Zimmerman, Milwaukee, and Frederick J. Van Zeeland, West Allis, Wis., assignors to Chain Belt Company, Milwaukee, Wis., a corporation of Wisconsin Application July 21, 1945, Serial No. 606,380

4 Claims. (Cl. 219—10)

This invention relates to induction heating, whereby it is possible, among other benefits, to weld tubular articles of the type employed as chain bushings and rollers. These parts are formed from a flat strip of metal and when shaped in tubular form, have a seam or cleft extending longitudinally thereof. The adequate welding of such seams has presented a difficult problem when the forming operation takes place prior to welding, for the seam is relatively short compared to the size of the tubular article. This makes it relatively difficult to weld by resistance welding methods and obtain uniform welding across the full length of the seam. The thickness of the stock compared to its other dimensions also renders it difficult to apply pressure to the article sufficient to produce a resistance weld without deforming the metal so as to require extensive machining operations thereafter.

The present invention employs induction heating as a medium for bringing the parts up to welding temperature and it has for its object to confine or concentrate the heating effects in the workpiece in such a manner that, without the addition of metal, a weld may be obtained on both sides of the seam edges, i. e., both inside as well as outside, and with sufficient penetration to secure a strong union of the metal. By localizing the heat at the seam edges, and by putting in the heat rapidly, there is considerable expansion of the metal in this region before the heat has been conducted to the other portions of the article. This expansion is resisted by the colder remaining portion of the tubular article and thus causes fusion and welding of the seam, even without the application of any additional external pressure. Of course, pressure may be applied in which event it is not necessary to apply as much heat in order to produce fusion.

In order to accomplish this concentration of heating effect, sufficiently high frequency current is employed with an induction coil having parallel conductors forming parts of the coil arranged on either side of the seam so that each conductor induces eddy currents in the region of the seam only, and the weld is accomplished before the portions of the article remote from the seam have become appreciably heated by conduction. The depth to which these eddy currents penetrate the workpiece is a function of the frequency employed and the frequency selected will vary depending on the wall thickness of the workpiece involved.

It has been proposed to weld the longitudinal seams of tubular articles by employing an induction heating coil formed in the shape of a loop and having parallel conductor portions arranged on either side of the seam, i. e., inside and outside and parallel thereto. Experiments with such coils have indicated lack of uniformity in the heating effects produced by the conducting portion which lies outside the tubular body and that portion which lies within it. The outside conductor produces the greatest heating effect along the edges of the metal adjacent the seam and fusion occurs first in this region. If the outside conductor is moved away from the seam a distance sufficient to reduce its heating effect to where it is equal to that produced by the inside conductor, excessive time is required to bring the metal to a welding heat with a reasonable amount of available power.

These coils also create a problem in getting the article into the coil, for the looped portion must be opened in order that the article may be threaded over one of the legs of the coil.

It is well understood that every conductor creates a magnetic flux traveling in paths concentric to the conductor and in planes transverse thereto. It is believed that the lack of uniformity in heating effects produced by the coils just mentioned is due to the creation of a flux surrounding the inside conductor, which travels around the workpiece, thereby dissipating energy which should be concentrated at the seam. This is not true of the conductor which lies outside the workpiece as its field is localized in the region of the seam only.

The present invention has for its object to prevent the creation of a flux passing through the body, circumferentially, because of the enclosure by the body of the inside conductor, in other words to make sure that the body does not act as a core, whereby the full effects of the conducting portions of the coil adjacent the section to be heated may be employed to heat the metal in this region and the heat will be produced at more nearly the same rate at both the inner and outer surfaces of the body.

Another object of the invention is to provide a heating coil which will produce a heating effect of the character heretofore described.

A further object is to provide a heating coil for welding tubular articles having a longitudinal seam whereby a weld may be obtained at the seam which is characterized by the inner edges being bonded as well as the outer edges.

Another object of the invention is to provide a method of welding longitudinal seams of tubular articles by induction heating, in which it is possible to put sufficient heat into the body at the region of the seam and without excessive time or power, so that a weld may be obtained at both sides of the seam.

Still another object of the invention is to provide a coil for heating and welding such articles which will permit the article to be more readily fed into the coil prior to heating and more readily removed therefrom after heating.

One embodiment of the invention is illustrated more or less diagrammatically in the accompanying drawing wherein.

Figure 1:
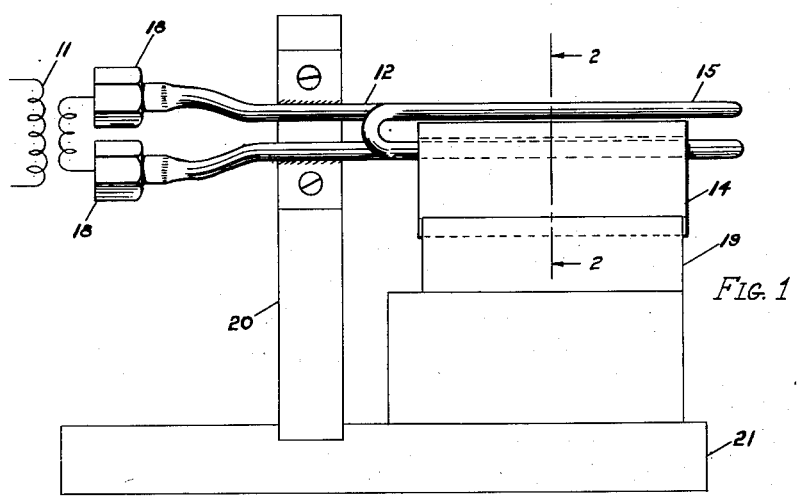
Figure 1 is a side elevation of a coil showing the disposition of the tubular article when its longitudinal seam is to be welded.

Referring to the coil illustrated in the drawing, the numeral 11 is intended to designate a transformer which receives current from the high frequency generator (not shown). The coil comprises a number of conducting portions which will be described in the order in which the current passes through them. Conductor portion 12 which receives current from the transformer is arranged parallel to, but outside the seam 13 of the tubular article 14 which is being welded. The conductor portion 12 extends for the full length of the seam, then is looped back and connects with a conductor portion 15 which is also arranged parallel to the seam and very closely adjacent its outer edges. The portion 15 extends slightly beyond the end of the tubular body and then it is bent back on itself to form another parallel conductor portion designated 16 extending through the inside of the article and substantially parallel to but spaced in a lower plane than the portion 15. Conductor portion 16 is also bent back on itself and forms a portion designated 17 which extends through the tubular body and is parallel to the portions 12, 15 and 16. Portion 17 connects to the other lead from the transformer. Suitable fittings 18 permit connection of the coil to a water line for cooling the coil.

Figure 2:
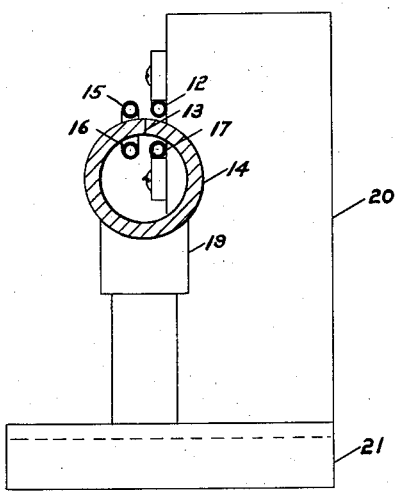
Figure 2 is an end view of the apparatus shown in Figure 1, the coil and workpiece being in section along the line 2—2 of Figure 1.
Figure 3:
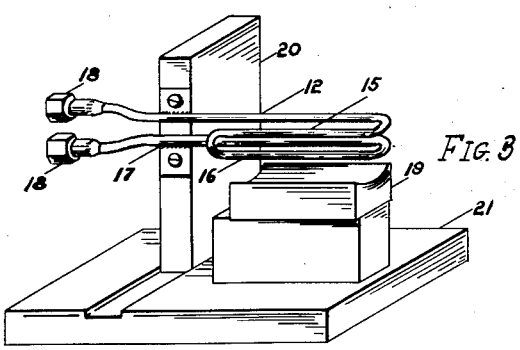
Figure 3 is a perspective view of the coil shown in Figures 1 and 2 with the article removed.

Referring to Figure 2, it will be seen that the conductors 12 and 15 on the outer side of the seam are arranged so that each is slightly to one side of the seam and also that conductors 16 and 17 are symmetrical with respect to conductors 12 and 15, only that they are disposed within the article 14. This coil, which may be referred to for simplicity as an inverted double hairpin coil, has the advantage that the tubular body 14 may be threaded over the conductor portions 16 and 17 and the current impressed on the coil without the necessity of opening and closing any gates or other parts necessary to complete a circuit.

The function of this coil and its electrical characteristics will now be described.

The conductor portion 16 tends to set up a flux which will pass around the body 14 and the same is true of the conductor portion 17, but since the current through the portions 17 and 16 is passing in opposite directions, these forces will oppose each other and the field is concentrated in the region of the seam 13. When the current is applied to the coil, the inner edges of the seam 13 are heated by the fields which are created by the conductors 16 and 17, and the outer edges by the fields which are created by conductors 12 and 15. When the Curie point is reached, the article loses its magnetic properties and eddy current heating proceeds to the point where the abutting edges of the seam are melted, at which point the pressure which the edges of the seam exert against each other due to the localized nature of the heating and thermal expansion backed up by the resistance of the colder portions of the body 14, produce a seam weld.

Prior to the point of fusion the eddy currents flow in paths parallel to the seam and adjacent each of the edges thereof, and those on the outer surface of the body connect with those on the inner surface to form closed loops, those on one seam edge traveling in an opposite direction to those on the other seam edge. After fusion has occurred, the eddy currents on the outer surface and also those on the inner surface become linked together and form a concentric pattern of current on both the inner and outer sides of the metal, with the paths crossing the seam at innumerable points rather than all traveling around the seam in parallel paths. This change appears to promote fusion.

It will be observed that the workpiece is out of contact with all parts of the coil, any suitable supporting means being employed such as the saddle designated 19 of refractory material on which the article may rest. In order to maintain the location of the coil to the workpiece, the coil is mounted on a standard 20, having a base portion 21 to which the saddle 19 is attached, as illustrated in the drawing.

With the heating coil shown, there are two conductor portions passing through the article and since these portions are connected in series, the current flows through them in opposite directions and the electromotive force induced in the tubular body from each enclosed conductor is opposed by the electromotive force created by the other enclosed conductor, so that circumferential circulating currents in the article and the heating effects created thereby are minimized. After the article loses its magnetic properties, the inside conductors should heat as rapidly as the outside conductors, but unless the loss of heat is prevented prior to the metal reaching the Curie point, a temperature difference will be established between the temperature of the metal at the outside edges of the seam and that of the inside edges, and while both conductors may heat at the same rate thereafter, the temperature of the inside edges will not catch up to the temperature of the outside edges and fusion will occur at the outside edges first. If the current application is continued until the inside edges are brought to fusion, the metal at the outside edges may be overheated and the article will be so deformed as to be worthless. With the present invention both edges may be brought to fusion practically simultaneously and the current shut off before too much metal has become melted.

In order to avoid blow-holes and disruption of the metal due to oxidation, welding may be performed in an atmosphere of inert gas, or non-oxygen containing gas, such as nitrogen. The parts may be enclosed in a chamber containing such an atmosphere during the welding operation, or the surrounding atmosphere may be controlled in other ways.

The coil described herein may be employed for other purposes than welding the longitudinal seam of tubular articles. For instance it may be desirable to heat the inside and outside of a chain bushing so as to harden the surfaces and to localize the hardness on one side of the bushing. Because of the ability of the coil to produce more uniform heating effects both inside and outside, when the article is placed within the field of the coil as herein described, notable advantages are obtained.

The invention having been described, what is claimed is:

1. The method of heating a longitudinal section of metal in a stationary tubular article by induction heating wherein a single conductor arranged inside and outside the article induces current in opposite directions throughout the length of the article and is disposed closely adjacent the external and internal surface of the section to be heated, which comprises obtaining more concentrated heating effect from the portion of the conductor passing through the article by conducting the current back through the article by way of a single conductor disposed closely adjacent said last mentioned portion in a direction opposite to that passing through the last mentioned portion, whereby the magnetic fields created by said currents within the article itself may oppose each other and the eddy currents induced thereby may be concentrated in the aforesaid section.

2. The method of heating a longitudinal section of metal in a tubular article which comprises arranging the article at rest within the field of an induction coil and generating eddy currents in the article which follow closely spaced parallel paths in opposite directions on each of the surfaces of the article, and along the section to be heated, the path of the currents in one direction on the outer surface of the article linking up with those on the inner surface by passing around the ends of the article, while the path of the currents in the other direction in the outer surface link up with those traveling in the opposite direction on the inner surface.

3. A method of welding the longitudinal seam of a metallic tubular article which comprises arranging the article at rest within the field of an induction coil and generating eddy currents in the article which follow parallel paths in opposite directions in closely contiguous relation on either side of the seam, the currents traveling in one direction on the outer surface of the article linking up with those on the inner surface by passing around the ends of the article, while the currents traveling in the opposite direction on the outer surface of the article link up with oppositely traveling currents on the inner surface of the article to form two oppositely flowing closed current paths on transversely opposite sides of the seam.

4. A method of heating a longitudinal strip in a tubular metallic article by induction heating of the metal thereof, which comprises moving the article to a position with the strip disposed between parallel loops of a high frequency induction coil connected in series, and subsequently while the article is at rest, generating two closed paths of eddy currents on the surface of said longitudinal strip, said currents being linked together around the ends of the strip and flowing in opposite, longitudinally parallel directions, while closely contiguous circumferentially of the article.

HAROLD L. ZIMMERMAN.
FREDERICK J. VAN ZEELAND.

REFERENCES CITED

The following references are of record in the file of this patent:

UNITED STATES PATENTS

| Number | Name | Date |
| --- | --- | --- |
| 1,915,047 | Blakeslee | June 20, 1933 |
| 1,929,212 | O'Neill | Oct. 3, 1933 |
| 2,024,906 | Bennett | Dec. 17, 1935 |
| 2,139,211 | Sessions | Dec. 6, 1938 |
| 2,371,459 | Mittelmann | Mar. 13, 1945 |
| 2,385,904 | Witty | Oct. 2, 1945 |

FOREIGN PATENTS

| Number | Country | Date |
| --- | --- | --- |
| 22,261 | Great Britain | Oct. 22, 1898 |

OTHER REFERENCES

Metal Progress, page 1337, December 1944.